US012175950B2

(12) United States Patent
Jeon et al.

(10) Patent No.: US 12,175,950 B2
(45) Date of Patent: Dec. 24, 2024

(54) ELECTRONIC DEVICE, METHOD, AND NON-TRANSITORY COMPUTER READABLE STORAGE MEDIUM IDENTIFYING BRIGHTNESS LEVEL ACCORDING TO ON PIXEL RATIO

(71) Applicant: Samsung Electronics Co., Ltd., Suwon-si (KR)

(72) Inventors: Namhyeon Jeon, Suwon-si (KR); Sungwon Ryu, Suwon-si (KR); Gyudong Eom, Suwon-si (KR); Dongseop Lee, Suwon-si (KR); Jongsik Kang, Suwon-si (KR); Seungjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/332,125

(22) Filed: Jun. 9, 2023

(65) Prior Publication Data

US 2024/0105142 A1 Mar. 28, 2024

Related U.S. Application Data

(63) Continuation of application No. PCT/KR2023/007325, filed on May 26, 2023.

(30) Foreign Application Priority Data

Sep. 26, 2022 (KR) ........................ 10-2022-0121799
Nov. 4, 2022 (KR) ........................ 10-2022-0146559

(51) Int. Cl.
*G09G 5/10* (2006.01)

(52) U.S. Cl.
CPC ....... *G09G 5/10* (2013.01); *G09G 2320/0626* (2013.01)

(58) Field of Classification Search
CPC ......................... G09G 5/10; G09G 2320/0626
(Continued)

(56) References Cited

U.S. PATENT DOCUMENTS 9,208,727 B2 12/2015 Lee et al.
9,898,963 B2 2/2018 Lee et al.
(Continued)

FOREIGN PATENT DOCUMENTS

KR 10-2017-0098119 A 8/2017
KR 2017098119 A * 8/2017 ............... G09G 3/20
(Continued)

OTHER PUBLICATIONS

International Search Report dated Sep. 26, 2023 for PCT/KR2023/007325.

PCT Written Opinion dated Sep. 26, 2023 for PCT/KR2023/007325.

*Primary Examiner* — Mark Edwards

(74) *Attorney, Agent, or Firm* — Nixon & Vanderhye P.C.

(57) ABSTRACT

An electronic device is provided. The electronic device includes a display including a display driver circuit and a display panel. The electronic device includes a processor. The display driver circuit is configured to obtain information regarding an image from the processor. The display driver circuit is configured to display, based on an on pixel ratio (OPR) of the image that is a first OPR, the image within a first brightness range from a first reference brightness level to a second reference brightness level greater than the first reference brightness level, through the display panel. The display driver circuit is configured to display, based on the OPR that is a second OPR lower than the first OPR, the image within a second brightness range from the first reference brightness level to a third reference brightness level greater than the second reference brightness level, through the display panel.

20 Claims, 10 Drawing Sheets

(58) Field of Classification Search
USPC .............................................................. 345/77
See application file for complete search history.

(56) References Cited

U.S. PATENT DOCUMENTS

| | | | |
|---|---|---|---|
| 10,388,229 B2 | 8/2019 | Park et al. | |
| 10,395,572 B2 | 8/2019 | Jee | |
| 11,205,369 B2 | 12/2021 | Yang et al. | |
| 11,488,519 B2 | 11/2022 | Hyeon | |
| 11,488,563 B2 | 11/2022 | Jun et al. | |
| 11,735,118 B2 | 8/2023 | Lee et al. | |
| 2019/0206331 A1 | 7/2019 | Lee et al. | |
| 2023/0144029 A1* | 5/2023 | Lee | G09G 3/325<br>345/77 |

FOREIGN PATENT DOCUMENTS

| | | |
|---|---|---|
| KR | 10-1779294 B1 | 9/2017 |
| KR | 10-2019-0083693 A | 7/2019 |
| KR | 102048562 B1 | 11/2019 |
| KR | 10-2020-0039156 A | 4/2020 |
| KR | 2021-0103374 A | 8/2021 |
| KR | 10-2021-0112690 A | 9/2021 |
| KR | 10-2673058 B1 | 6/2024 |

* cited by examiner

ELECTRONIC DEVICE, METHOD, AND NON-TRANSITORY COMPUTER READABLE STORAGE MEDIUM IDENTIFYING BRIGHTNESS LEVEL ACCORDING TO ON PIXEL RATIO

CROSS-REFERENCE TO RELATED APPLICATIONS

This application is a continuation of International Application No. PCT/KR2023/007325 designating the United States, filed on May 26, 2023, in the Korean Intellectual Property Receiving Office and claiming priority to Korean Patent Application Nos. 10-2022-0121799, filed on Sep. 26, 2022, and 10-2022-0146559, filed on Nov. 4, 2022, in the Korean Intellectual Property Office, the disclosures of all of which are incorporated by reference herein in their entireties.

BACKGROUND

Field

The disclosure relates to an electronic device, a method, and a non-transitory computer readable storage medium identifying a brightness level according to on pixel ratio (OPR).

Description of Related Art

An electronic device may include a display for displaying visual information. For example, the display may include a display driver integrated circuit and a display panel including a plurality of pixels. The display driver integrated circuit may be configured to display the visual information obtained from a processor of the electronic device on the display panel, by causing at least some of the plurality of pixels to emit light.

The above information is presented as related arts only to assist with an understanding of the present disclosure. No determination has been made, and no assertion is made, as to whether any of the above might be applicable as prior art with regard to the disclosure.

SUMMARY

According to an example embodiment, and electronic device is provided. The electronic device includes a display including a display driver circuit and a display panel. The electronic device includes a processor. The display driver circuit is configured to obtain information regarding an image from the processor. The display driver circuit is configured to display, based on an on pixel ratio (OPR) of the image that is a first OPR, the image within a first brightness range from a first reference brightness level to a second reference brightness level higher than the first reference brightness level, through the display panel. The display driver circuit is configured to display, based on the OPR that is a second OPR lower than the first OPR, the image within a second brightness range from the first reference brightness level to a third reference brightness level higher than the second reference brightness level, through the display panel.

According to an example embodiment, a method is provided. The method may be executed in an electronic device including a processor and a display including a display driver circuit and a display panel. The method includes obtaining, by the display driver circuit, information regarding an image from the processor. The method includes displaying, based on an on pixel ratio (OPR) of the image that is a first OPR, the image within a first brightness range from a first reference brightness level to a second reference brightness level higher than the first reference brightness level, through the display panel, by the display driver circuit. The method includes displaying, based on the OPR that is a second OPR lower than the first OPR, the image within a second brightness range from the first reference brightness level to a third reference brightness level higher than the second reference brightness level, through the display panel, by the display driver circuit.

According to an example embodiment, a non-transitory computer-readable storage medium is provided. The non-transitory computer-readable storage medium stores one or more programs. The one or more programs may include instructions that, when executed by a display driver circuit of an electronic device including a display panel, cause the electronic device to obtain information regarding an image. The one or more programs includes instructions that, when executed by the display driver circuit, cause the electronic device to display, based on an on pixel ratio (OPR) of the image that is a first OPR, the image within a first brightness range from a first reference brightness level to a second reference brightness level higher than the first reference brightness level, through the display panel. The one or more programs includes instructions that, when executed by the display driver circuit, cause the electronic device to display, based on the OPR that is a second OPR lower than the first OPR, the image within a second brightness range from the first reference brightness level to a third reference brightness level higher than the second reference brightness level, through the display panel.

According to an example embodiment, an electronic device is provided. The electronic device includes a display including a display driver circuit and a display panel. The electronic device includes a processor. The display driver circuit is configured to display a first image in a first brightness level, through the display panel. The display driver circuit is configured to obtain, while the first image is displayed in the first brightness level, information regarding a second image with an on pixel ratio (OPR) lower than an OPR of the first image, from the processor. The display driver circuit is configured to display, based on the obtaining, the second image changed from the first image in a second brightness level higher than the first brightness level, through the display panel.

According to an example embodiment, a method is provided. The method may be executed in an electronic device including a processor and a display including a display driver circuit and a display panel. The method includes displaying, by the display driver circuit, a first image in a first brightness level, through the display panel. The method includes obtaining, by the display driver circuit, while the first image is displayed in the first brightness level, information regarding a second image with an on pixel ratio (OPR) lower than an OPR of the first image, from the processor. The method includes displaying, by the display driver circuit, based on the obtaining, the second image changed from the first image in a second brightness level higher than the first brightness level, through the display panel.

According to an example embodiment, a non-transitory computer-readable storage medium is provided. The non-transitory computer-readable storage medium stores one or more programs. The one or more programs may include instructions that, when executed by a display driver circuit of an electronic device including a display panel, cause the electronic device to display, a first image in a first brightness level, through the display panel. The one or more programs may include instructions that, when executed by the display driver circuit, cause the electronic device to obtain, while the first image is displayed in the first brightness level, information regarding a second image with an on pixel ratio (OPR) lower than an OPR of the first image, from the processor. The one or more programs may include instructions that, when executed by the display driver circuit, cause the electronic device to display, based on the obtaining, the second image changed from the first image in a second brightness level higher than the first brightness level, through the display panel.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
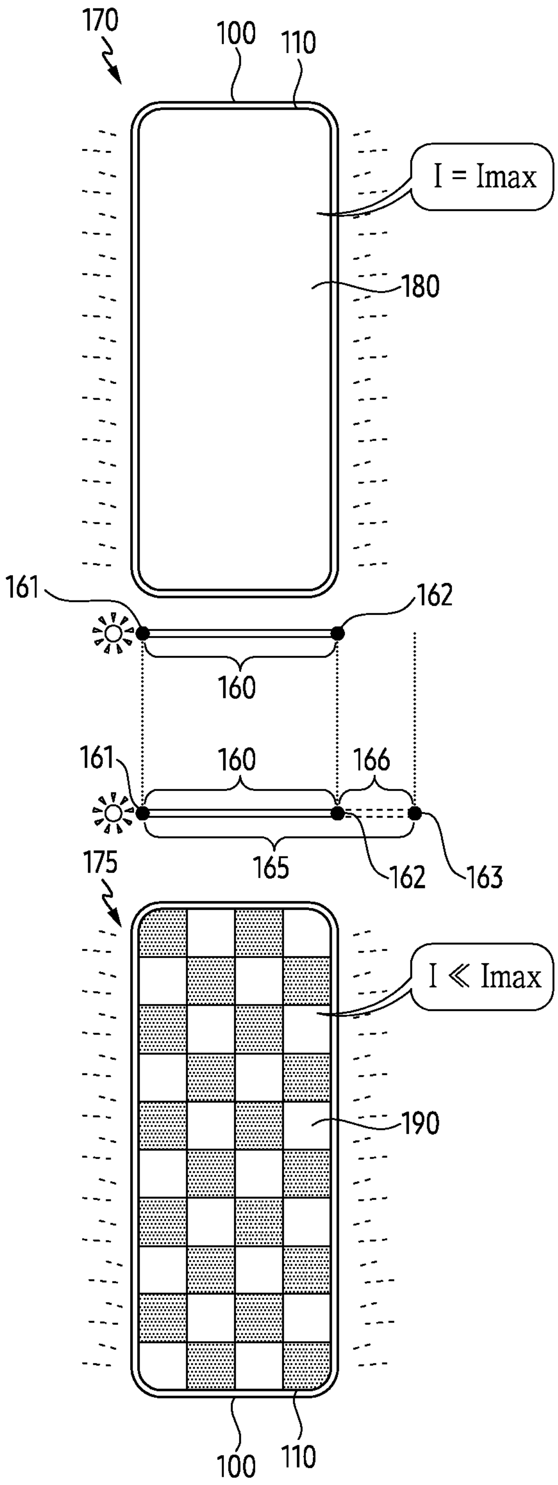
FIG. 1 illustrates an exemplary electronic device.

FIG. 1 illustrates an exemplary electronic device.

Figure 9:
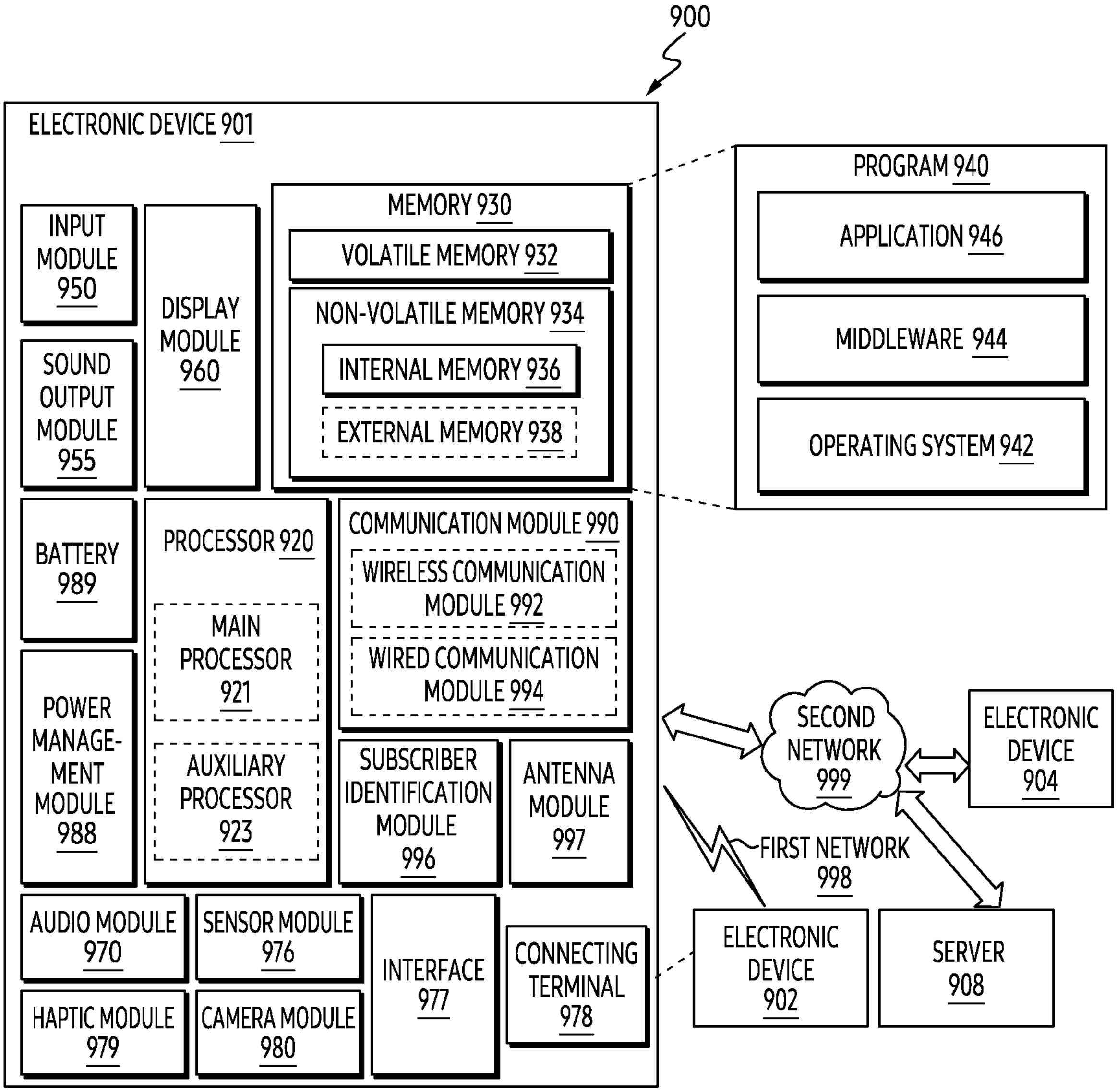
FIG. 9 is a block diagram of an example electronic device in a network environment according to various embodiments.
Figure 10:
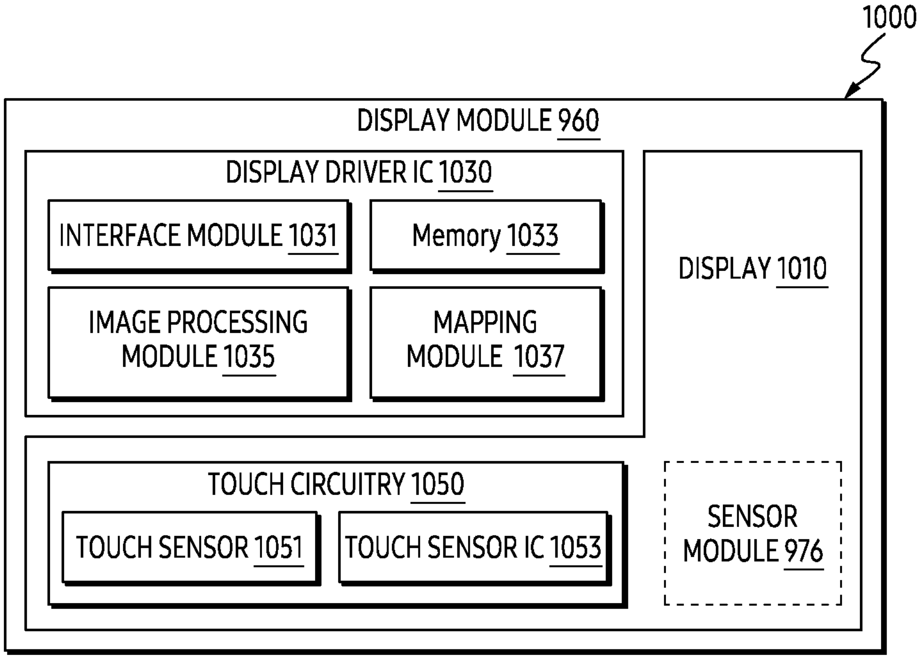
FIG. 10 is a block diagram of a display module according to various embodiments.

Referring to FIG. 1, an electronic device 100 (e.g., an electronic device 901 of FIG. 9) may include a display 110 (e.g., a display module 960 of FIG. 9 or a display module 960 of FIG. 10). For example, the display 110 may display an image (e.g., an image 180 and/or an image 190) based on a current obtained from a power management integrated circuit (PMIC) (e.g., a power management module 988 of FIG. 9) of the electronic device 100 being driven based on a rated capacity.

For example, the image may be displayed at a brightness level within a first brightness range 160. For example, the first brightness range 160 may indicate a range from a first reference brightness level 161 to a second reference brightness level 162. For example, the first brightness range 160 may be higher than or equal to the first reference brightness level 161 and may be lower than or equal to the second reference brightness level 162.

For example, the second reference brightness level 162 may be a maximum brightness level that can be provided through the display 110, under the condition that on pixel ratio (OPR) of the image 180 is 100% (or 255), as in a state 170. The OPR may represent a ratio of at least one turned-on pixel versus a plurality of pixels in a display panel (e.g., a display panel 230 of FIG. 2) of the display 110. The OPR may represent an average value of a grayscale of the at least one pixel, but the disclosure is not limited thereto. For example, the second reference brightness level 162 may be the maximum brightness level that can be provided through the display 110 under the condition that a color of the entire area of the image 180 is white as in the state 170. For example, the second reference brightness level 162 may be a brightness level provided through the display 110 in a state in which the current I obtained from the PMIC, being driven based on the rated capacity, is the maximum current $I_{max}$.

For example, the image 190 displayed through the display 110 may have an OPR lower than the OPR of the image 180, as in the state 175. For example, when the image 180 is displayed on the display 110 at the second reference brightness level 162 which is the maximum brightness level of the first brightness range 160, the current I obtained from the PMIC may be the maximum current $I_{max}$, whereas when the image 190 is displayed on the display 110 at the second reference brightness level 162 which is the maximum brightness level of the first brightness range 160, the current I obtained from the PMIC may be less than the maximum current $I_{max}$. For example, the display 110 may cause, in displaying the image 190 at the second reference brightness level 162, heat lower than the heat generated from the display 110 when displaying the image 180 at the second reference brightness level 162. For example, the display 110 may have an ability to display the image 190 at a brightness level higher than the second reference brightness level 162.

For example, a second brightness range 165 may be used in the electronic device 100 to enhance the quality of the image 190 displayed through the display 110. For example, the second brightness range 165 may indicate a range from the first reference brightness level 161 up to the third reference brightness level 163, the third reference brightness level 163 being higher than the second reference brightness level 162. For example, the second brightness range 165 may indicate a range higher than or equal to the first reference brightness level 161 and lower than or equal to the third reference brightness level 163. For example, the maximum brightness level of the second brightness range 165 may be the third reference brightness level 163, unlike the first brightness range 160 having the second reference brightness level 162 as the maximum brightness level. For example, the second brightness range 165 may further include another range 166 reaching from the second reference brightness level 162 up to the third reference brightness level 163 in addition to the first brightness range 160.

For example, the second brightness range 165 (or the range 166) may be used when displaying an image having an OPR less than a maximum OPR (e.g., 100% or 255), such as the image 190. For example, the electronic device 100 may include components for providing the second brightness range 165. The above components may be illustrated referring to FIG. 2.

Figure 2:
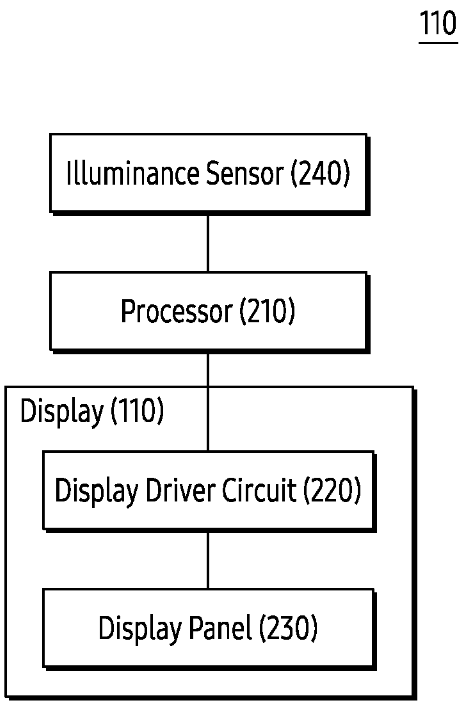
FIG. 2 illustrates a simplified block diagram of an exemplary electronic device.

FIG. 2 is a simplified block diagram of an exemplary electronic device.

Referring to FIG. 2, the electronic device 100 may include a processor (e.g., including processing circuitry) 210 (e.g., a processor 920 of FIG. 9) and a display 110. For example, the electronic device 100 may further include an illuminance sensor 240 (e.g., a sensor module 976 of FIG. 9).

For example, the processor 210 may be operably or operatively coupled with the display 110 or the display driver circuit 220 in the display 110. For example, the processor 210 being operably or operatively coupled with the display 110 (or the display driver circuit 220) may indicate that the processor 210 is directly connected to the display 110 (or the display driver circuit 220). For example, the processor 210 being operatively coupled to the display 110 (or the display driver circuit 220) may indicate that the processor 210 is connected to the display 110 (or the display driver circuit 220) through another component of the electronic device 100. For example, the processor 210 being operably or operatively coupled with the display 110 (or the display driver circuit 220) may indicate that the state of the processor 210 is in a state capable of controlling the display 110 (or the display driver circuit 220). For example, the fact that the processor 210 being operably or operatively coupled with the display 110 (or the display driver circuit 220) may indicate that the operation of the display 110 (or the display driver circuit 220) is caused to perform based on information, data, signals, or instructions obtained from the processor 210. However, the disclosure is not limited thereto.

For example, the processor 210 may be operably or operatively coupled with the illuminance sensor 240.

For example, the display 110 may include a display driver circuit 220 (e.g., a display driver IC 1030 of FIG. 10) and a display panel 230 (e.g., a display 1010 of FIG. 10). For example, the display driver circuit 220 may be operably or operatively coupled with the display panel 230.

For example, the illuminance sensor 240 may be used to obtain data on brightness around the electronic device 100. For example, the illuminance sensor 240 may be used to obtain data indicating an illuminance value around the electronic device 100. For example, the electronic device 100 may provide a first mode for automatically changing a brightness level of the display 110 depending on the illuminance value and a second mode for manually changing a brightness level of the display 110. For example, the first mode may indicate a mode in which an image is displayed through the display panel 230 at the brightness level corresponding to the illuminance value, without an explicit user input. For example, the second mode may indicate a mode in which the image is displayed through the display panel 230 at a brightness level of the display 110 indicated by an explicit user input. For example, the illuminance sensor 240 may be utilized while the first mode of the first mode and the second mode is provided or enabled. However, the disclosure is not limited thereto.

For example, the display driver circuit 220 may obtain information on an image from the processor 210. For example, the information may be provided from the processor 210 to display the image on the display panel 230. For example, the information may be provided from the processor 210 based on a refresh rate or a scan rate. However, the disclosure is not limited thereto.

For example, the display driver circuit 220 may identify an on pixel ratio (OPR) of the image. For example, the OPR may be used to identify a brightness range illustrated with reference to FIG. 1. For example, the OPR may represent an average OPR. As a non-limiting example, in case where OPR of a first frame (or a first frame data) is 'a', OPR of a second frame (or a second frame data) is 'b', and OPR of a third frame (or a third frame data) is 'c', the display driver circuit 220 may identify the OPR as (a+b+c)/3. For example, a period for identifying the OPR may be longer than a frame period. However, the disclosure is not limited thereto.

For example, the display driver circuit 220 may identify the brightness level of the display 110 within a first brightness range 160 based on the OPR. For example, the display driver circuit 220 may identify the brightness level of the display 110 within a second brightness range 165 based on the OPR. For example, the second reference brightness level 162, which is the maximum brightness level of the first brightness range 160, may be a fixed value (or level). For example, the third reference brightness level 163, which is the maximum brightness level of the second brightness range 160, may be adaptively changed depending on the OPR, as opposed to the second reference brightness level 162 which is the maximum brightness level of the first brightness range 160. For example, when the OPR is 30%, the third reference brightness level 163 may be a first value, and when the OPR is 70%, the third reference brightness level 163 may be a second value lower than the first value. However, the disclosure is not limited thereto. As a non-limiting example, the second reference brightness level 162, which is the maximum brightness level of the first brightness range 160, may be adaptively changed. For example, the second reference brightness level 162 may gradually increase. For example, the second reference brightness level 162 may gradually increase based on the brightness level of the display 110 exceeding a threshold value within the first brightness range 160.

For example, the display driver circuit 220 may identify the brightness range based on the OPR and display the image within the identified brightness range. The brightness range identified based on the OPR may be illustrated with reference to FIG. 3.

Figure 3:
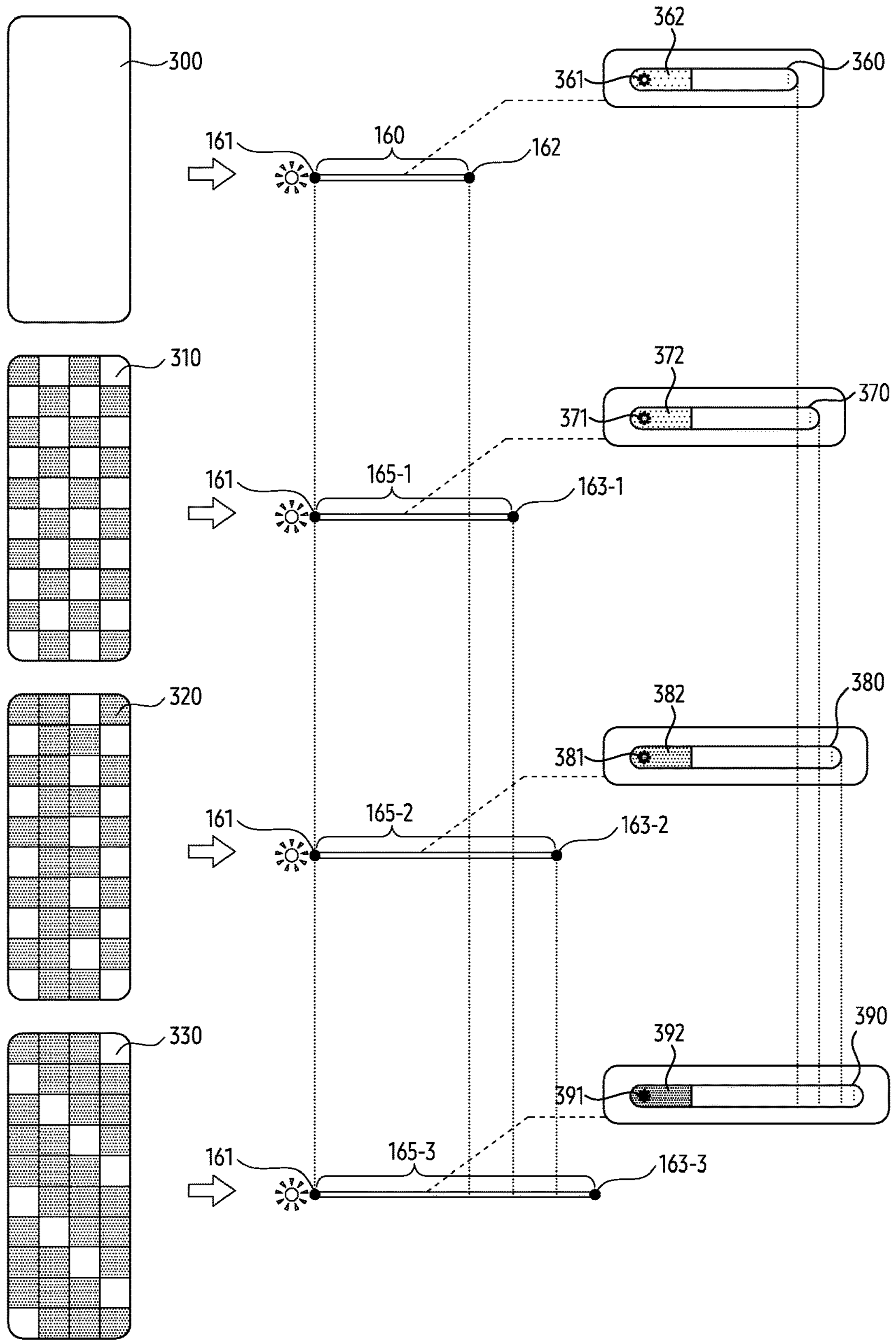
FIG. 3 illustrates examples of a brightness range changing according to on pixel ratio (OPR) of an image.

FIG. 3 shows an example of a brightness range changed depending on an on pixel ratio (OPR) of an image.

Referring to FIG. 3, based on identifying that the OPR of the image 300 is the maximum OPR, the display driver circuit 220 may identify the brightness range for displaying the image 300 as the first brightness range 160 from the first reference brightness level 161 to the second reference brightness level 162. For example, the display driver circuit 220 may display the image 300 through the display panel 230 within the first brightness range 160.

For example, the processor 210 may obtain data (e.g., a bar indicator 620 and/or a bar indicator 632 of FIG. 6) for displaying the bar indicator 360 indicating that the first brightness range 160 is applied. For example, the display driver circuit 220 may display the bar indicator 360 based on the data obtained from the processor 210. For example, the bar indicator 360 may be displayed in a user interface for a quick access panel (or a control center). For example, the bar indicator 360 may be displayed in a user interface for global settings. However, the disclosure is not limited thereto.

For example, based on identifying that the OPR of an image 310 is the first OPR lower than the maximum OPR, the display driver circuit 220 may identify the brightness range for displaying the image 310 as the second brightness range 165-1 from the first reference brightness level 161 to the third reference brightness level 163-1. For example, the display driver circuit 220 may display the image 310 through the display panel 230 within the second brightness range 165-1. For example, the image 310 may be displayed at a brightness level higher than that of the image 300. For example, the maximum brightness level for the image 300 may be the second reference brightness level 162. For example, since the OPR (e.g., the first OPR) of the image 310 is lower than the OPR (e.g., the maximum OPR) of the image 300, the maximum brightness level for the image 310 may be the third reference brightness level 163-1 higher than the second reference brightness level 162 which is the maximum brightness level for the image 300.

For example, the processor 210 may obtain data for displaying a bar indicator 370 (e.g., the bar indicator 620 and/or the bar indicator 632 of FIG. 6) indicating that the second brightness range 165-1 distinct from the first brightness range 160 is applied. For example, the display driver circuit 220 may display the bar indicator 370 based on the data obtained from the processor 210. For example, the bar indicator 370 may be displayed within a user interface for a quick access panel (or a control center). For example, the bar indicator 370 may be displayed within a user interface for global settings. However, the disclosure is not limited thereto.

For example, the expression of the bar indicator 370 may be different from that of the bar indicator 360 in order to indicate that the second brightness range 165-1 is applied. For example, the bar indicator 370 may be visually highlighted with respect to the bar indicator 360. For example, the length of the bar indicator 370 may be longer than the length of the bar indicator 360. For example, the color of the visual element 371 in the bar indicator 370 may be different from the color of the visual element 361 in the bar indicator 360. Although not illustrated in FIG. 3, the color of a portion of the visual element 371 corresponding to the range from the second reference brightness level 162 to the third reference brightness level 163-1 may be visually highlighted with respect to each of the color of another portion of the visual element 371 corresponding to at least a portion of the range from the first reference brightness level 161 to the second reference brightness level 162 and the color of the visual element 361. However, the disclosure is not limited thereto. For example, the color of the visual element 372 in the bar indicator 370 for indicating the brightness level may be different from the color of the visual element 362 in the bar indicator 360 for indicating the brightness level. However, the disclosure is not limited thereto.

For example, based on identifying that the OPR of an image 320 is the second OPR lower than the first OPR, the display driver circuit 220 may identify the brightness range for displaying the image 320 as the second brightness range 165-2 from the first reference brightness level 161 to the third reference brightness level 163-2. For example, the display driver circuit 220 may display the image 320 through the display panel 230 within the second brightness range 165-2. For example, the image 320 may be displayed at a brightness level higher than that of the image 310. For example, the maximum brightness level for the image 310 may be the third reference brightness level 163-1. For example, since the OPR (e.g., the second OPR) of the image 320 is lower than the OPR (e.g., the first OPR) of the image 310, the maximum brightness level for the image 320 may be the third reference brightness level 163-2 higher than the third reference brightness level 163-1 which is the maximum brightness level for the image 310.

For example, the processor 210 may obtain data for displaying a bar indicator 380 (e.g., the bar indicator 620 and/or the bar indicator 632 of FIG. 6) indicating that the second brightness range 165-2 distinct from the first brightness range 160 is applied. For example, the display driver circuit 220 may display the bar indicator 380 based on the data obtained from the processor 210. For example, the bar indicator 380 may be displayed within a user interface for a quick access panel (or a control center). For example, the bar indicator 380 may be displayed within a user interface for global setting. However, the disclosure is not limited thereto.

For example, the expression of the bar indicator 380 may be different from that of the bar indicator 360 in order to indicate that the second brightness range 165-2 is applied. For example, the bar indicator 380 may be visually highlighted with respect to the bar indicator 360. For example, the length of the bar indicator 380 may be longer than the length of the bar indicator 360. For example, the color of the visual element 381 in the bar indicator 380 may be different from the color of the visual element 361 in the bar indicator 360. Although not illustrated in FIG. 3, the color of a portion of the visual element 381 corresponding to the range from the second reference brightness level 162 to the third reference brightness level 163-2 may be visually highlighted with respect to each of the color of another portion of the visual element 381 corresponding to at least a portion of the range from the first reference brightness level 161 to the second reference brightness level 162 and the color of the visual element 361. However, the disclosure is not limited thereto. For example, the color of the visual element 382 in the bar indicator 380 for indicating the brightness level may be different from the color of the visual element 362 in the bar indicator 360 for indicating the brightness level. However, the disclosure is not limited thereto.

For example, the expression of the bar indicator 380 may be different from that of the bar indicator 370 in order to indicate that the second brightness range 165-2 is applied. For example, the bar indicator 380 may be visually highlighted with respect to the bar indicator 370. For example, the length of the bar indicator 380 may be longer than the length of the bar indicator 370. For example, the color of the visual element 381 in the bar indicator 380 may be different from the color of the visual element 371 in the bar indicator 370. Although not illustrated in FIG. 3, the color of a portion of the visual element 381 corresponding to the range from the third reference brightness level 163-1 to the third reference brightness level 163-2 may be visually highlighted with respect to the color of another portion of the visual element 381 corresponding to at least a portion of the range from the second reference brightness level 162 to the third reference brightness level 163-1. However, the disclosure is not limited thereto. For example, the color of the visual element 382 in the bar indicator 380 for indicating the brightness level may be different from the color of the visual element 372 in the bar indicator 370 for indicating the brightness level. However, the disclosure is not limited thereto.

For example, based on identifying that the OPR of an image 330 is the third OPR lower than the second OPR, the display driver circuit 220 may identify the brightness range for displaying the image 330 as the second brightness range 165-3 from the first reference brightness level 161 to the third reference brightness level 163-3. For example, the display driver circuit 220 may display the image 330 through the display panel 230 within the second brightness range 165-3. For example, the image 330 may be displayed at a brightness level higher than that of the image 320. For example, the maximum brightness level for the image 320 may be the third reference brightness level 163-2. For example, since the OPR (e.g., the third OPR) of the image 330 is lower than the OPR (e.g., the second OPR) of the image 320, the maximum brightness level for the image 330 may be the third reference brightness level 163-3 higher than the third reference brightness level 163-2 which is the maximum brightness level for the image 320.

For example, the processor 210 may obtain data for displaying a bar indicator 390 (e.g., the bar indicator 620 and/or the bar indicator 632 of FIG. 6) indicating that the second brightness range 165-3 distinct from the first brightness range 160 is applied. For example, the display driver circuit 220 may display the bar indicator 390 based on the data obtained from the processor 210. For example, the bar indicator 390 may be displayed within the user interface for a quick access panel (or a control center). For example, the bar indicator 390 may be displayed within the user interface for global settings. However, the disclosure is not limited thereto.

For example, the expression of the bar indicator 390 may be different from that of the bar indicator 360 in order to indicate that the second brightness range 165-3 is applied. For example, the bar indicator 390 may be visually highlighted with respect to the bar indicator 360. For example, the length of the bar indicator 390 may be longer than the length of the bar indicator 360. For example, the color of the visual element 391 in the bar indicator 390 may be different from the color of the visual element 361 in the bar indicator 360. Although not illustrated in FIG. 3, the color of a portion of the visual element 391 corresponding to the range from the second reference brightness level 162 to the third reference brightness level 163-3 may be visually highlighted with respect to each of the color of another portion of the visual element 391 corresponding to at least a portion of the range from the first reference brightness level 161 to the second reference brightness level 162 and the color of the visual element 361. However, the disclosure is not limited thereto. For example, the color of the visual element 392 in the bar indicator 390 for indicating the brightness level may be different from the color of the visual element 362 in the bar indicator 360 for indicating the brightness level. However, the disclosure is not limited thereto.

For example, the expression of the bar indicator 390 may be different from that of the bar indicator 370 in order to indicate that the second brightness range 165-3 is applied. For example, the bar indicator 390 may be visually highlighted with respect to the bar indicator 370. For example, the length of the bar indicator 390 may be longer than the length of the bar indicator 370. For example, the color of the visual element 391 in the bar indicator 390 may be different from the color of the visual element 371 in the bar indicator 370. Although not illustrated in FIG. 3, the color of a portion of the visual element 391 corresponding to the range from the third reference brightness level 163-1 to the third reference brightness level 163-3 may be visually highlighted with respect to the color of another portion of the visual element 381 corresponding to at least a portion of the range from the second reference brightness level 162 to the third reference brightness level 163-1. However, the disclosure is not limited thereto. For example, the color of the visual element 392 in the bar indicator 390 for indicating the brightness level may be different from the color of the visual element 372 in the bar indicator 370 for indicating the brightness level. However, the disclosure is not limited thereto.

For example, the expression of the bar indicator 390 may be different from that of the bar indicator 380 in order to indicate that the second brightness range 165-3 is applied. For example, the bar indicator 390 may be visually highlighted with respect to the bar indicator 380. For example, the length of the bar indicator 390 may be longer than the length of the bar indicator 380. For example, the color of the visual element 391 in the bar indicator 390 may be different from the color of the visual element 381 in the bar indicator 380. Although not illustrated in FIG. 3, the color of a portion of the visual element 391 corresponding to the range from the third reference brightness level 163-2 to the third reference brightness level 163-3 may be visually highlighted with respect to the color of another portion of the visual element 381 corresponding to at least a portion of the range from the second reference brightness level 162 to the third reference brightness level 163-2. However, the disclosure is not limited thereto.

For example, the color of the visual element 392 in the bar indicator 390 for indicating the brightness level may be different from the color of the visual element 382 in the bar indicator 380 for indicating the brightness level. However, the disclosure is not limited thereto.

For example, the display driver circuit 220 may store a plurality of reference ranges for the OPR of an image. For example, the plurality of reference ranges may include a first reference range from a first value to a second value higher than the first value, a second reference range from the second value to a third value higher than the second value, and a third reference range from the third value to a fourth value higher than the third value. For example, the plurality of reference ranges may be associated with a plurality of brightness ranges, respectively. For example, the display driver circuit 220 may identify a brightness range for displaying the image as a second brightness range 165-3 associated with the first reference range, based on the OPR within the first reference range. For example, the display driver circuit 220 may identify a brightness range for displaying the image as a second brightness range 165-2 associated with the second reference range, based on the OPR within the second reference range. For example, the display driver circuit 220 may identify a brightness range for displaying the image as a second brightness range 165-1 associated with the third reference range, based on the OPR within the third reference range. For example, the display driver circuit 220 may identify a brightness range for displaying the image as the first brightness range 160, based on the OPR outside the first reference range, the second reference range, and the third reference range. However, the disclosure is not limited thereto.

As described above, the display driver circuit 220 may adaptively adjust or change the brightness range depending on the OPR of the image. The electronic device 100 can enhance the quality of the image displayed through the display panel 230, owing to adaptively adjusting the brightness range using the display driver circuit 220.

Referring back to FIG. 1, the second brightness range 165 may further include a range 166 in addition to the first brightness range 160. For example, various methods may be executed in the electronic device 100 to provide a brightness level within the range 166.

For example, the display driver circuit 220 may store reference data for a plurality of display brightness values for providing the first brightness range 160. For example, the reference data may include display brightness values for each of a plurality of brightness levels within the first brightness range 160. For example, the display brightness values may correspond to greyscales, respectively. For example, the reference data may be represented as shown in Table 1 below.

TABLE 1

| Brightness Level Greyscale | 1st Brightness Level | 2nd Brightness Level | 3rd Brightness Level | 4th Brightness Level | 5th Brightness Level | 6th Brightness Level | 7th Brightness Level |
|---|---|---|---|---|---|---|---|
| 0 | a1 | a2 | a3 | a4 | a5 | a6 | a7 |
| 40 | a8 | a9 | a10 | a11 | a12 | a13 | a14 |
| 80 | a15 | a16 | a17 | a18 | a19 | a20 | a21 |
| 120 | a22 | a23 | a24 | a25 | a26 | a27 | a28 |
| 160 | a29 | a30 | a31 | a32 | a33 | a34 | a35 |
| 200 | a36 | a37 | a38 | a39 | a40 | a41 | a42 |
| 255 | a43 | a44 | a45 | a46 | a47 | a48 | a49 |

In Table 1 above, a1 to a49 represent the plurality of display brightness values, respectively. In the Table 1, the seventh brightness level may correspond to the second reference brightness level 162.

The display driver circuit 220 may provide a brightness level within the range 166, using the reference data for providing the first brightness range 160 as shown in Table 1 above. For example, the display driver circuit 220 may obtain from the processor 210 a control command indicating a brightness level outside the first brightness range 160. For example, the control command may be obtained based on a second cycle longer than a first cycle in which the information on the image is obtained. However, the disclosure is not limited thereto. For example, the control command may indicate a brightness level that is higher than the second reference brightness level 162 and lower than or equal to the third reference brightness level 163. For example, the control command may indicate the second reference brightness level 162 (e.g., the seventh brightness level in the Table 1), which is the maximum brightness level of the first brightness range 160. For example, the display driver circuit 220 may recognize the second reference brightness level 162 indicated by the control command as providing the maximum brightness level corresponding to the OPR of the image to be displayed through the display panel 230. However, the disclosure is not limited thereto.

For example, in response to the control command, the display driver circuit 220 may identify a display brightness value indicating the brightness level, by performing extrapolation method using at least some of the plurality of display brightness values in the reference data. For example, the extrapolation method may be performed by Equation 1 as follows:

$$\text{Display Brightness Value}=ai+(aj-ai)\times(\text{Brightness Level}-i\text{th Brightness Level})/(j\text{th Brightness Level}-i\text{th Brightness Level}) \quad \text{<Equation 1>}$$

wherein the display brightness value of the Equation 1 represents the display brightness value for the brightness level when the grayscale is 'c' (where 'c' is a natural number of 1 to 255), which is identified by the display driver circuit 220, 'ai' of the Equation 1 represents the display brightness value for the ith brightness level (e.g., a brightness level lower than or equal to the second reference brightness level) when the grayscale is 'c' amongst the plurality of brightness levels in the reference data, 'aj' of the Equation 1 represents the display brightness value for the jth brightness level (a brightness level higher than the first reference brightness and lower than or equal to the second reference brightness level) when the grayscale is 'c' amongst the plurality of brightness levels in the reference data, the brightness level of Equation 1 is the brightness level indicated by the control command, indicating a brightness level higher than the second reference brightness level 162 and lower than or equal to the third reference brightness level 163, and 'r' of the Equation 1 is an additional correction value, indicating a predetermined value.

For example, when 'i' is 6 and T is 7, the above Equation 1 may be expressed as Equation 2 as follows:

$$\text{Display Brightness Value}=a48+(a49-a48)\times(\text{Brightness Level}-6\text{th Brightness Level})/(7\text{th Brightness Level}-6\text{th Brightness Level}) \quad \text{<Equation 2>}$$

For example, the display driver circuit 220 may display the image on the display panel 230 at the brightness level indicated by the control command, based on the identified brightness value.

For example, the display driver circuit 220 may identify a current to be applied to each of a plurality of pixels in the display panel 230, using the reference data, and may display an image at the brightness level, based on providing the identified current to each of the plurality of pixels. For example, in response to the control command, the display driver circuit 220 may identify data on a difference between the second reference brightness level 162, which is the maximum brightness level of the first brightness range 160, and the brightness level indicated by the control command, based on at least some of the plurality of display brightness values in the reference data. For example, the display driver circuit 220 may identify a current to be applied to each of the plurality of pixels, based on the data. For example, the current may be identified based on gamma correction. For example, the display driver circuit 220 may display the image at the brightness level, based on providing the identified current to each of the plurality of pixels.

For example, the display driver circuit 220 may modulate or modify the image obtained from the processor 210, using the reference data, and may display the modified image at the brightness level. For example, in response to the control command, the display driver circuit 220 may identify data on a difference between the second reference brightness level 162, which is the maximum brightness level of the first brightness range 160, and the brightness level indicated by the control command, based on at least some of the plurality of brightness values in the reference data. For example, the display driver circuit 220 may display the image at the brightness level through the display panel 230 by modulating or modifying the image based on the data. For example, the modulation (or the modification) of the image may be performed for the gamma correction.

The above examples illustrate an example in which the reference data includes a plurality of display brightness values for providing the first brightness range 160, but the reference data may include a plurality of display brightness values for providing the second brightness range 165. For example, the display driver circuit 220 may store the reference data including the plurality of display brightness values for providing the second brightness range 165. The reference data may be represented as shown in Table 2 as follows.

TABLE 2

| Brightness Level Greyscale | 1st Brightness Level | 2nd Brightness Level | 3rd Brightness Level | 4th Brightness Level | 5th Brightness Level | 6th Brightness Level | 7th Brightness Level | 8th Brightness Level | 9th Brightness Level |
|---|---|---|---|---|---|---|---|---|---|
| 0 | a1 | a2 | a3 | a4 | a5 | a6 | a7 | b1 | b2 |
| 40 | a8 | a9 | a10 | a11 | a12 | a13 | a14 | b3 | b4 |
| 80 | a15 | a16 | a17 | a18 | a19 | a20 | a21 | b5 | b6 |
| 120 | a22 | a23 | a24 | a25 | a26 | a27 | a28 | b7 | b8 |
| 160 | a29 | a30 | a31 | a32 | a33 | a34 | a35 | b9 | b10 |
| 200 | a36 | a37 | a38 | a39 | a40 | a41 | a42 | b11 | b12 |
| 255 | a43 | a44 | a45 | a46 | a47 | a48 | a49 | b13 | b14 |

In the Table 2 above, 'a1' to 'a49' and 'b1' to 'b14' represent the plurality of display brightness values. In the Table 2, each of the eighth brightness level and the ninth brightness level may correspond to a brightness level between the second reference brightness level 162 and the third reference brightness level 163.

For example, the display driver circuit 220 may use the reference data represented as in the Table 2 to identify some of the plurality of display brightness values corresponding to the brightness level indicated by the control command, in response to the control command indicating the brightness level higher than the second reference brightness level 162 and lower than or equal to the third reference brightness level 163. For example, the display driver circuit 220 may display an image at the brightness level through the display panel 230, based on some of the plurality of display brightness values. For example, at least one display brightness value corresponding to a brightness level higher than the second reference brightness level 162 and lower than or equal to the third reference brightness level 163 amongst the plurality of display brightness values may be obtained by performing calibration (e.g., multi-time programmable (MTP) calibration) using an image having an OPR lower than a reference OPR. For example, the brightness level higher than the second reference brightness level 162 and lower than or equal to the third reference brightness level 163 cannot be obtained while displaying a full white image as in the image 180 of FIG. 1, and therefore, the at least one display brightness value may be included in the reference data by performing the calibration using the image having the OPR lower than the reference OPR. The image having the OPR lower than the reference OPR may be illustrated with reference to FIG. 4.

Figure 4:
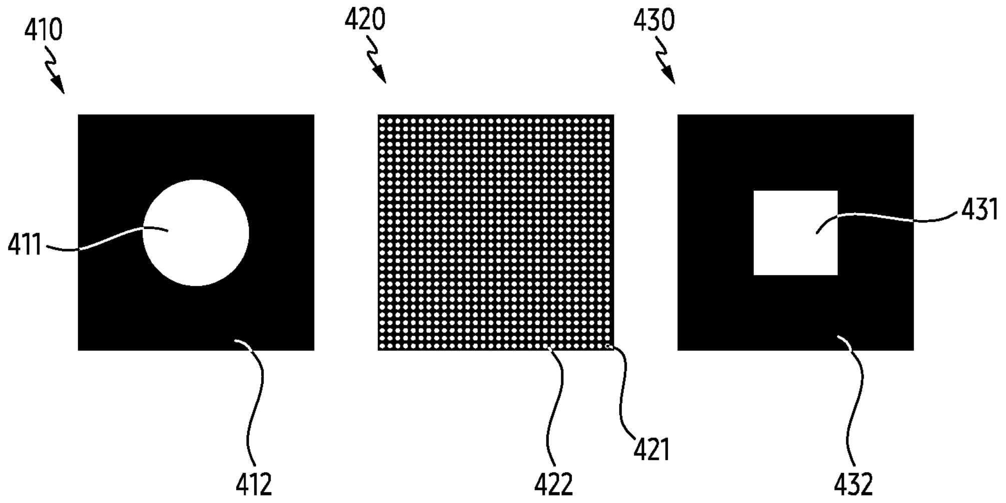
FIG. 4 illustrates an example of an image having OPR lower than a reference OPR.

FIG. 4 illustrates an example of an image having an OPR lower than a reference OPR.

Referring to FIG. 4, the electronic device 100 may include the at least one display brightness value in the reference data, by performing the calibration based on displaying an image having an OPR lower than the reference OPR, such as the image 410, the image 420, and/or the image 430. For example, the image 410 may include an area 411 in which some of the plurality of pixels in the display panel 230 are turned on (or enabled) and another area 412 in which the other ones (or the remaining ones) of the plurality of pixels in the display panel 230 are turned off (or disabled). For example, the image 420 may include an area 421 in which some of the plurality of pixels in the display panel 230 are turned on (or enabled) and an area 422 in which the other ones (or the remaining ones) of the plurality of pixels in the display panel 230 are turned off (or disabled). For example, the image 430 may include an area 431 in which some of the plurality of pixels in the display panel 230 are turned on (or enabled) and an area 432 in which the other ones (or remaining ones) of the plurality of pixels in the display panel 230 are turned off (or disabled). However, the disclosure is not limited thereto.

Referring back to FIG. 2, the display driver circuit 220 may display the image at a brightness level higher than the second reference brightness level 162 and lower than or equal to the third reference brightness level 163, based on changing the grayscale value of the image based on the OPR of the image obtained from the processor 210. For example, the grayscale value may be reduced according to the change. For example, a difference between the grayscale value and the reduced grayscale value may be identified based on the OPR. For example, under the condition that the OPR of the image is a first OPR, the display driver circuit 220 may obtain a first image in which the grayscale value of the image is reduced by a first value, and may display the first image at the brightness level through the display panel 230. For example, under the condition that the OPR of the image is a second OPR lower than the first OPR, the display driver circuit 220 may obtain a second image in which the grayscale value of the image is reduced by a second value smaller than the first value, and may display the second image at the brightness level through the display panel 230. For example, each of the first value and the second value may be identified further based on gamma correction. Reducing the grayscale value by the first value and reducing the grayscale value by the second value may be illustrated with reference to FIG. 5.

Figure 5:
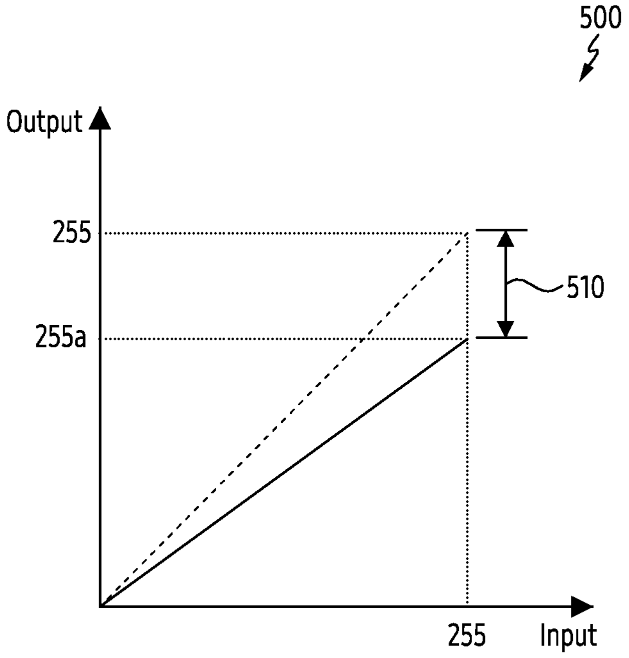
FIG. 5 illustrates an example of a method of adaptively changing a grayscale value of an image according to OPR of the image.
Figure 5:
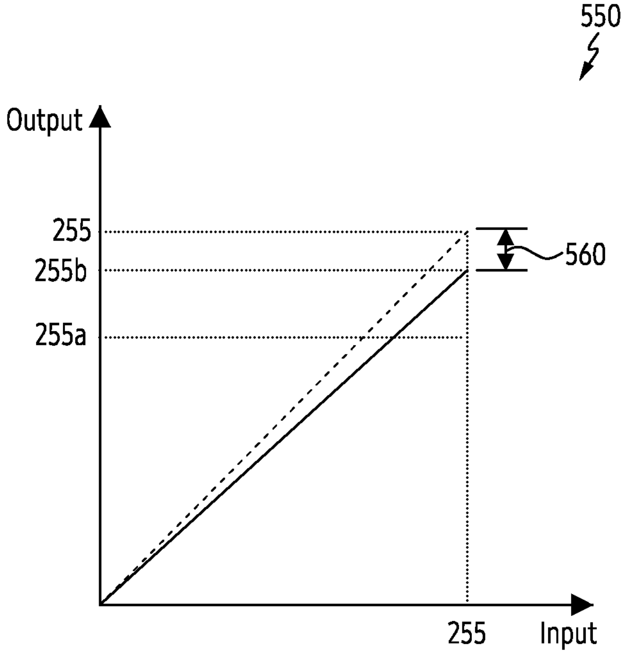

FIG. 5 illustrates an example of a method of adaptively changing a grayscale value of an image according to an OPR of the image.

Referring to FIG. 5, the display driver circuit 220 may identify the OPR of the image obtained from the processor 210 and adjust the grayscale value of the image based on the identified OPR. For example, the processor 210 may display the first image by reducing the grayscale value of the image by the first value, based on the image having the first OPR, and may display the second image by reducing the grayscale value of the image by the second value smaller than the first value, based on the image having the second OPR lower than the first OPR. For example, a chart (e.g., graph) 500 indicates a relationship between an input grayscale value and an output grayscale value when an OPR is the first OPR, and a chart (e.g., graph) 550 indicates a relationship between an input grayscale value and an output grayscale value when an OPR is the second OPR lower than the first OPR. For example, a horizontal axis of each of the chart 500 and the chart 550 represents the input grayscale value, and a vertical axis of each of the chart 500 and the chart 550 represents the output grayscale value. For example, the input grayscale value may represent the grayscale value of the image obtained from the processor 210, and the output grayscale value may represent the grayscale value of the image displayed or to be displayed through the display panel 230. For example, the input grayscale value may indicate the grayscale value of the image before the adjustment, and the output grayscale value may indicate the grayscale value of the image after the adjustment.

In the chart 500, when the OPR is the first OPR, the output grayscale value may be obtained by multiplying the input grayscale value by an inclination 'a' (wherein 'a' is a real number greater than 0 and less than 1). For example, when the input grayscale value is '255', the output grayscale value may be '255a'. For example, a difference 510 between the input grayscale value and the output grayscale value may be '225-255a'.

In the chart 550, when the OPR is the second OPR lower than the first OPR, the output grayscale value may be obtained by multiplying the input grayscale value by an inclination 'b' (wherein 'b' is a real number greater than 0 and less than 1). For example, since the second OPR is lower than the first OPR, the inclination 'b' may be greater than the inclination 'a'. For example, when the input grayscale value is '255', the output grayscale value may be '255b', which is greater than '255a'. For example, a difference 560 between the input grayscale value and the output grayscale value may be '255-255b' which is less than the difference 510.

Each of the chart 500 and the chart 550 illustrates that the relationship between the input grayscale value and the output grayscale value is of a linear relationship, but it is only for convenience of description. The relationship may be of a non-linear relationship. For example, each of the chart 500 and the chart 550 is to represent that the difference between the input grayscale value and the output grayscale value corresponds to the OPR. For example, as the OPR of the image goes lower, the difference may decrease. However, the disclosure is not limited thereto.

Referring back to FIG. 2, the display driver circuit 220 may provide the brightness level within the range 166 by combining at least some of the above-described examples.

For example, the second brightness range 165 may be enabled or disabled based on a preset (e.g., specified) condition (e.g., a predetermined condition). For example, the set condition may include a condition that the remaining level of the rechargeable battery in the electronic device 100 is greater than or equal to a reference level. For example, the second brightness range 165 may be enabled under a condition that the remaining level is greater than or equal to the reference level, or may be disabled under a condition that the remaining level is less than the reference level. For example, the set condition may include a condition that an illuminance value around the electronic device 100 is greater than or equal to a threshold value. For example, the second brightness range 165 may be enabled under a condition that the illuminance value is equal to or greater than the threshold value, or may be disabled under a condition that the illuminance value is less than the threshold value. For example, the second brightness range 165 may be enabled under a condition that the illuminance value less than the threshold value is changed to be greater than or equal to the threshold value. For example, a first time interval in which the brightness level is increased within a portion of the second brightness range 165 between the second reference brightness level 162 and the third reference brightness level 163 may be longer than a second time interval in which the illuminance value is changed from a first value less than the threshold value to a second value greater than or equal to the threshold value. For example, the adjustment of the brightness level may be gradually performed within the portion of the second brightness range 165. However, the disclosure is not limited thereto.

For example, the set condition may be to receive a user input through a user interface displayed through the display panel 230. For example, the second brightness range 165 may be enabled based on the user input. The user interface and the user input may be illustrated in greater detail below with reference to FIG. 6.

Figure 6:
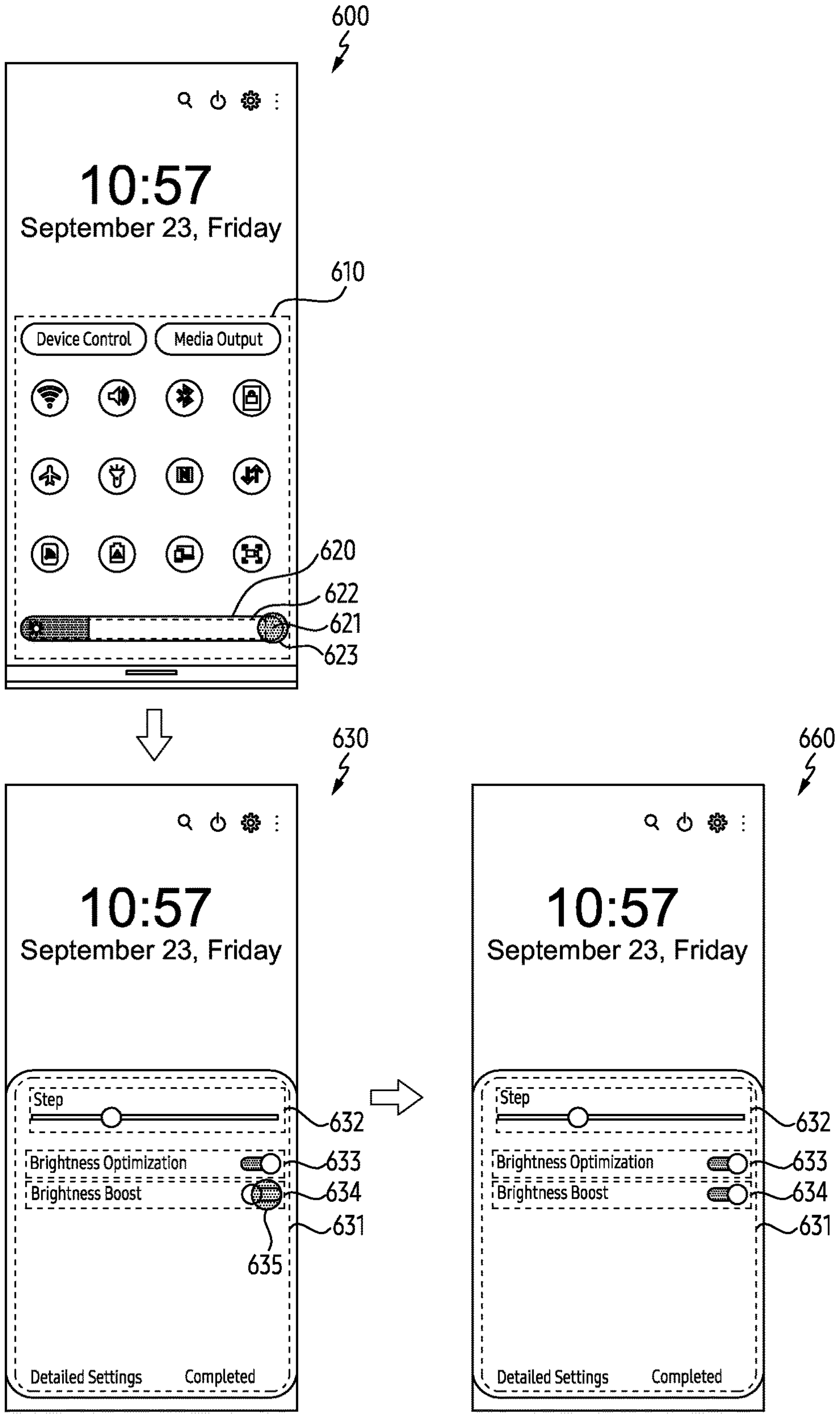
FIG. 6 illustrates an example of a user interface for enabling a second brightness range.

FIG. 6 illustrates an example of a user interface for activating the second brightness range.

Referring to FIG. 6, as in a state 600, a bar indicator 620 for adjusting a brightness level may be displayed on the display panel 230. For example, the bar indicator 620 may be displayed within a quick panel 610. However, the disclosure is not limited thereto. For example, the bar indicator 620 may include a visual gauge element 622 for adjusting the brightness level within the brightness range and an executable object 621 for setting related to the brightness level. For example, the state 600 may be changed to a state 630 in response to a user input 623 to the executable object 621.

As in a state 630, a setting window 631 displayed in response to the user input 623 may include an executable object 634 for activating the second brightness range 165. For example, the setting window 631 may further include an executable object 633 for activating adaptive adjustment of the brightness level, based on the illuminance value (e.g., an illuminance value obtained through the illuminance sensor 240) around the electronic device 100, and a bar indicator 632 corresponding to the bar indicator 620. For example, the executable object 634 in the state 630 may indicate that the second brightness range 165 is disabled.

For example, the state 630 may be changed to a state 660 in response to a user input 635 to the executable object 634.

As in the state 660, the setting window 631 displayed in response to the user input 635 may include an executable object 634 indicating that the second brightness range 165 is enabled. For example, based on the executable object 634 activating the second brightness range 165 based on the user input 635, the executable object 634 may be displayed on the display panel 230, as in the state 660. For example, in the state 660, the executable object 633 and the bar indicator 632 may be maintained within the setting window 631. However, the disclosure is not limited thereto.

Referring back to FIG. 2, since the electronic device 100 is configured to adaptively adjusts the brightness range based on the OPR of the image, the electronic device 100 may change the brightness range according to the change in the OPR of the image. For example, the change in the brightness range may be gradually executed. However, the disclosure is not limited thereto.

For example, the display driver circuit 220 may display a first image through the display panel 230 at a first brightness level. For example, while the first image is displayed at the first brightness level, the display driver circuit 220 may obtain, from the processor 210, information about a second image having an OPR lower than that an OPR of the first image. For example, the display driver circuit 220 may display the second image changed from the first image at a second brightness level higher than the first brightness level, through the display panel 230, based on the obtaining. For example, the first image and the second image may be displayed while the illuminance value around the electronic device 100 is equal to or greater than a threshold value (or while the illuminance around the electronic device 100 is equal to or greater than a threshold illuminance). For example, the illuminance value being greater than or equal to the threshold value may indicate that it is appropriate to provide the maximum brightness level that can be provided through the display panel 230. The change in brightness level according to the change in the OPR may be illustrated with reference to FIG. 7.

Figure 7:
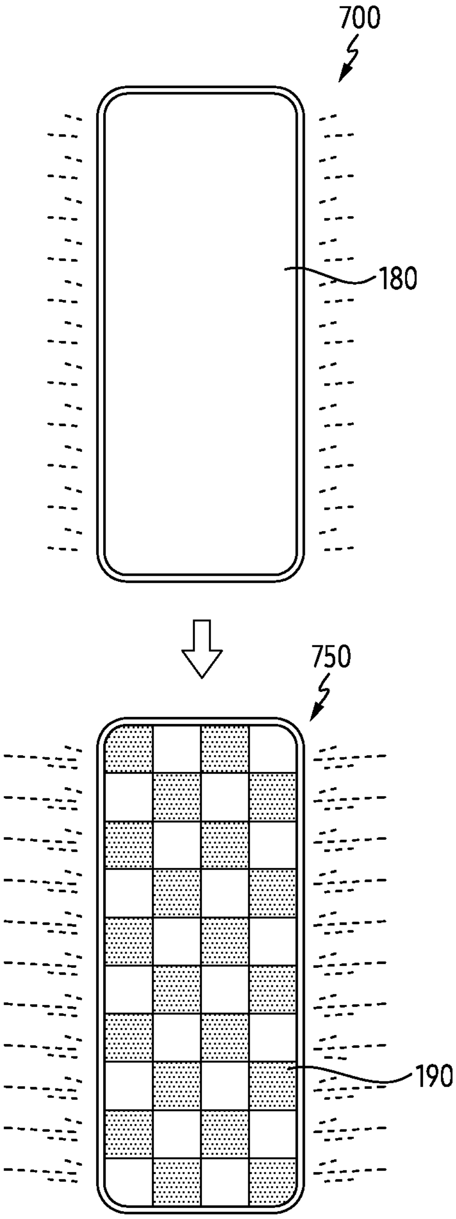
FIG. 7 illustrates an example of changing a brightness level based on changing a first image having a first OPR to a second image having a second OPR.

FIG. 7 illustrates an example of changing a brightness level based on changing a first image having a first OPR to a second image having a second OPR.

Referring to FIG. 7, the display driver circuit 220 may display the image 180 at the first brightness level through the display panel 230, as in a state 700. For example, on condition that the illuminance value around the electronic device 100 is equal to or greater than the threshold value, adaptively adjusting the brightness level based on the illuminance value is enabled as indicated by the executable object 633 of FIG. 6, and the image 180 is of a full white image, the first brightness level may be a second reference brightness level 162 which is the maximum brightness level within the first brightness range 160.

The display driver circuit 220 may obtain, from the processor 210, information about the image 190 having an OPR lower than the OPR of the image 180, while the image 180 is displayed at the first brightness level. For example, the image 190 may be an image following the image 180. For example, the state 700 may be changed to a state 750 based on the obtaining.

For example, as in the state 750, the display driver circuit 220 may display the image 190 changed from the image 180 through the display panel 230 at a second brightness level higher than the first brightness level, based on the obtaining. For example, on condition that the illuminance value is maintained no less than the threshold value, adaptively adjusting of the brightness level based on the illuminance value is enabled, and the image 190 has an OPR lower than the OPR of the image 180, the second brightness level may be a third reference brightness level 163, which is the maximum brightness level within the second brightness range 165.

As described above, the electronic device 100 can identify the OPR of the image and adaptively identify the brightness level based on the identified OPR, thereby enhancing the quality of the service provided by displaying the image through the display panel 230. For example, the display driver circuit 220 may include a component for identifying an OPR, a component for performing gamma correction for providing a brightness level, and a component for providing current (or voltage) to pixels in the display panel 230 for the brightness level. The above components may be illustrated with reference to FIG. 8.

Figure 8:
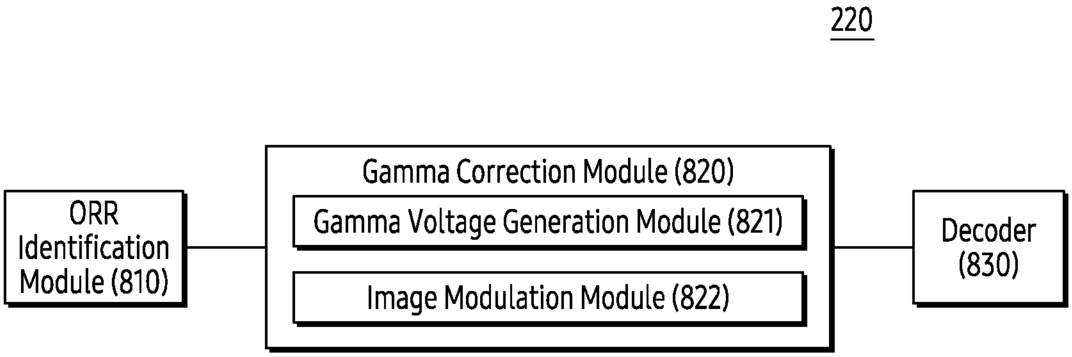
FIG. 8 illustrates an example of components of a display driver circuit in an exemplary electronic device.

FIG. 8 illustrates an example of components of a display driver circuit in an exemplary electronic device.

Referring to FIG. 8, the display driver circuit 220 may include an OPR identification module (e.g. including OPR identification circuitry and/or executable program instructions) 810, a gamma correction module (e.g., including gamma correction circuitry and/or executable program instructions) 820, and a decoder 830.

For example, the OPR identification module 810 may include various circuitry used to identify an OPR of an image obtained from the processor 210. For example, the OPR identification module 810 may identify the OPR by obtaining data on the OPR of the image from the processor 210 or analyzing the image obtained from the processor 210. For example, the OPR identified by the OPR identification module 810 may be provided to the gamma correction module 820.

For example, the gamma correction module 820 may include various circuitry, including, for example, and without limitation, a gamma voltage generation module (e.g., including gamma voltage generation circuitry and/or executable program instructions) 821 and/or an image modulation module (e.g., including various image modulation circuitry and/or executable program instructions) 822.

For example, the gamma voltage generation module 821 may obtain a plurality of gamma voltages based on at least some of preset (or predetermined) gamma curves and provide the plurality of gamma voltages. For example, the gamma voltage generation module 821 may change at least some of the gamma curves by changing the maximum gamma voltage and/or the minimum gamma voltage. For example, the gamma voltage generation module 821 may provide information on the plurality of gamma voltages to the decoder 830, based on the OPR obtained from the OPR identification module 821 or an offset (or the difference) identified based on the OPR.

For example, the image modulation module 822 may modulate or modify the image obtained from the processor 210, based on the OPR obtained from the OPR identification module 810 or an offset (or the difference) identified based on the OPR. For example, the image modulation module 822 may provide information on the modulated or modified image to the decoder 830.

For example, the decoder 830 may generate image signals, based at least in part on the information obtained from the gamma voltage generation module 821 and/or the information obtained from the image modulation module 822. For example, the image signals may be obtained from converting the information obtained from the gamma voltage generation module 821 and/or the information obtained from the image modulation module 822. Although not illustrated in FIG. 8, the image signals obtained through the decoder 830 may be output from the display panel 230 via a plurality of amplifiers. However, the disclosure is not limited thereto.

At least some of the operations of the display driver circuit 220 described above may be executed by other components of the electronic device 100. For example, the at least some of the operations of the display driver circuit 220 may be executed by the processor 210.

FIG. 9 is a block diagram of an electronic device in a network environment according to an example of the disclosure. Referring to FIG. 9, an electronic device 901 in a network environment 900 may communicate with an electronic device 902 via a first network 998 (e.g., a short-range wireless communication network), or at least one of an electronic device 904 or a server 908 via a second network 999 (e.g., a long-range wireless communication network). According to an example, the electronic device 901 may communicate with the electronic device 904 via the server 908. According to an example, the electronic device 901 may include a processor 920, a memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to an example, as at least part of the data processing or computation, the processor 920 may store a command or data received from another component (e.g., the sensor module 976 or the communication module 990) in a volatile memory 932, process the command or the data stored in the volatile memory 932, and store resulting data in a non-volatile memory 934. According to an example, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an example, the auxiliary processor 923 (e.g., an image signal processor or a communication processor) may be implemented as part of another component (e.g., the camera module 980 or the communication module 990) functionally related to the auxiliary processor 923. According to an example, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an example, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an example, the display module 960 may include a touch sensor adapted to detect a touch, or a pressure sensor adapted to measure the intensity of force incurred by the touch.

The audio module 970 may convert a sound into an electrical signal and vice versa. According to an example, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an example, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an example, the interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an example, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an example, the haptic module 979 may include, for example, a motor, a piezoelectric element, or an electric stimulator.

The camera module 980 may capture a still image or moving images. According to an example, the camera module 980 may include one or more lenses, image sensors, image signal processors, or flashes.

The power management module 988 may manage power supplied to the electronic device 901. According to an example, the power management module 988 may be implemented as at least part of, for example, a power management integrated circuit (PMIC).

The battery 989 may supply power to at least one component of the electronic device 901. According to an example, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an example, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and/or authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mm Wave band) to address, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 992 may support various requirements specified in the electronic device 901, an external electronic device (e.g., the electronic device 904), or a network system (e.g., the second network 999). According to an example, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an example, the antenna module 997 may include an antenna including a radiating element including a conductive material or a conductive pattern formed in or on a substrate (e.g., a printed circuit board (PCB)). According to an example, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an example, another component (e.g., a radio frequency integrated circuit (RFIC)) other than the radiating element may be additionally formed as part of the antenna module 997.

According to various embodiments, the antenna module 997 may form a mmWave antenna module. According to an example, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an example, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another example of the disclosure, the external electronic device 904 may include an internet-of-things (IoT) device. The server 908 may be an intelligent server using machine learning and/or a neural network. According to an example, the external electronic device 904 or the server 908 may be included in the second network 999. The electronic device 901 may be applied to intelligent services (e.g., smart home, smart city, smart car, or healthcare) based on 5G communication technology or IoT-related technology.

FIG. 10 is a block diagram 1000 illustrating the display module 960 according to various embodiments. Referring to FIG. 10, the display module 960 may include a display 1010 and a display driver integrated circuit (DDI) 1030 to control the display 1010. The DDI 1030 may include an interface module (e.g., including interface circuitry) 1031, memory 1033 (e.g., buffer memory), an image processing module (e.g., including image processing circuitry and/or executable program instructions 1035, and/or a mapping module (e.g., including various circuitry and/or executable program instructions) 1037. The DDI 1030 may receive image information that contains image data or an image control signal corresponding to a command to control the image data from another component of the electronic device 901 via the interface module 1031. For example, according to an embodiment, the image information may be received from the processor 920 (e.g., the main processor 921 (e.g., an application processor)) or the auxiliary processor 923 (e.g., a graphics processing unit) operated independently from the function of the main processor 921. The DDI 1030 may communicate, for example, with touch circuitry 1050 or the sensor module 976 via the interface module 1031. The DDI 1030 may also store at least part of the received image information in the memory 1033, for example, on a frame by frame basis. The image processing module 1035 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1010. The mapping module 1037 may generate a voltage value or a current value corresponding to the image data pre-processed or post-processed by the image processing module 1035. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1010 may be driven, for example, based at least in part on the voltage value or the current value such that visual information (e.g., a text, an image, or an icon) corresponding to the image data may be displayed via the display 1010.

According to an embodiment, the display module 960 may further include the touch circuitry 1050. The touch circuitry 1050 may include a touch sensor 1051 and a touch sensor IC 1053 to control the touch sensor 1051. The touch sensor IC 1053 may control the touch sensor 1051 to sense a touch input or a hovering input with respect to a certain position on the display 1010. To achieve this, for example, the touch sensor 1051 may detect (e.g., measure) a change in a signal (e.g., a voltage, a quantity of light, a resistance, or a quantity of one or more electric charges) corresponding to the certain position on the display 1010. The touch circuitry 1050 may provide input information (e.g., a position, an area, a pressure, or a time) indicative of the touch input or the hovering input detected via the touch sensor 1051 to the processor 920. According to an embodiment, at least part (e.g., the touch sensor IC 1053) of the touch circuitry 1050 may be formed as part of the display 1010 or the DDI 1030, or as part of another component (e.g., the auxiliary processor 923) disposed outside the display module 960.

According to an embodiment, the display module 960 may further include at least one sensor (e.g., a fingerprint sensor, an iris sensor, a pressure sensor, or an illuminance sensor) of the sensor module 976 or a control circuit for the at least one sensor. In such a case, the at least one sensor or the control circuit for the at least one sensor may be embedded in one portion of a component (e.g., the display 1010, the DDI 1030, or the touch circuitry 1050)) of the display module 960. For example, when the sensor module 976 embedded in the display module 960 includes a biometric sensor (e.g., a fingerprint sensor), the biometric sensor may obtain biometric information (e.g., a fingerprint image) corresponding to a touch input received via a portion of the display 1010. As another example, when the sensor module 976 embedded in the display module 960 includes a pressure sensor, the pressure sensor may obtain pressure information corresponding to a touch input received via a partial or whole area of the display 1010. According to an embodiment, the touch sensor 1051 or the sensor module 976 may be disposed between pixels in a pixel layer of the display 1010, or over or under the pixel layer.

According to an example embodiment, an electronic device may comprise a display including a display driver circuit and a display panel. According to an embodiment, the electronic device may comprise a processor. According to an embodiment, the display driver circuit may be configured to obtain information about an image from the processor. According to an embodiment, the display driver circuit may be configured to display, based on an on pixel ratio (OPR) of the image that is a first OPR, the image within a first brightness range from a first reference brightness level to a second reference brightness level greater than the first reference brightness level, through the display panel. According to an embodiment, the display driver circuit may be configured to display, based on the OPR that is a second OPR lower than the first OPR, the image within a second brightness range from the first reference brightness level to a third reference brightness level higher than the second reference brightness level, through the display panel. According to an embodiment, the third reference brightness level among the second reference brightness level and the third reference brightness level may be identified based on the OPR. According to an embodiment, at least a portion of a bar indicator displayed through the display panel for indicating that the second brightness range is applied may be visually highlighted with respect to a bar indicator displayed through the display panel indicating that the first brightness range is applied.

According to an example embodiment, the electronic device may comprise an illuminance sensor. According to an embodiment, the processor may be configured to obtain data indicating an illuminance value around the electronic device through the illuminance sensor. According to an embodiment, the display driver circuit may be configured to display, based on the data indicating the illuminance value that greater than or equal to a threshold value and the OPR that is the first OPR, the image in a brightness level corresponding to the second reference brightness level, through the display panel. According to an embodiment, the display driver circuit may be configured to display, based on the data indicating the illuminance value that is greater than or equal to the threshold value and the OPR that is the second OPR, the image in a brightness level corresponding to the third reference brightness level, through the display panel.

According to an example embodiment, the display driver circuit may be configured to store reference data regarding a plurality of display brightness values for providing the first brightness range. According to an embodiment, the display driver circuit may be configured to obtain the information regarding the image of the OPR that is the second OPR from the processor. According to an embodiment, the display driver circuit may be configured to obtain a control command indicating a brightness level that is greater than the second reference brightness level and is less than or equal to the third reference brightness level from the processor. According to an embodiment, the display driver circuit may be configured to identify, in response to the control command, a display brightness value indicating the brightness level by executing an extrapolation using at least some of the plurality of display brightness values. According to an embodiment, the display driver circuit may be configured to display, based on the display brightness value, the image in the brightness level, through the display panel.

According to an embodiment, the display panel may comprise a plurality of pixels. According to an embodiment, the display driver circuit may be configured to store reference data regarding a plurality of display brightness values for providing the first brightness range. According to an embodiment, the display driver circuit may be configured to obtain the information regarding the image of the OPR that is the second OPR from the processor. According to an embodiment, the display driver circuit may be configured to obtain a control command indicating a brightness level that is greater than the second reference brightness level and is less than or equal to the third reference brightness level, from the processor. According to an embodiment, the display driver circuit may be configured to identify, in response to the control command, data regarding a difference between the second reference brightness level that is a maximum brightness level of the first brightness range and the brightness level. According to an embodiment, the display driver circuit may be configured to identify current to be provided to each of the plurality of pixels, based on the data. According to an embodiment, the display driver circuit may be configured to display, based on providing the identified current to each of the plurality of pixels, the image in the brightness level, through the display panel.

According to an example embodiment, the display driver circuit may be configured to store reference data regarding a plurality of display brightness values for providing the first brightness range. According to an embodiment, the display driver circuit may be configured to obtain the information regarding the image of the OPR that is the second OPR from the processor. According to an embodiment, the display driver circuit may be configured to obtain a control command indicating a brightness level that is greater than the second reference brightness level and is less than or equal to the third reference brightness level. According to an embodiment, the display driver circuit may be configured to identify, in response to the control command, data regarding a difference between the second reference brightness level that is a maximum brightness level of the first brightness range and the brightness level. According to an embodiment, the display driver circuit may be configured to display the image at the brightness level through the display panel, by modulating the image based on the data.

According to an example embodiment, the display driver circuit may be configured to store reference data regarding a plurality of display brightness values for providing the second brightness range. According to an embodiment, the display driver circuit may be configured to obtain the information regarding the image of the OPR that is the second OPR from the processor. According to an embodiment, the display driver circuit may be configured to obtain a control command indicating a brightness level that is greater than the second reference brightness level and is less than or equal to the third reference brightness level. According to an embodiment, the display driver circuit may be configured to identify, in response to the control command, a portion of the plurality of display brightness values corresponding to the brightness level. According to an embodiment, the display driver circuit may be configured to display, based on the portion of the plurality of display brightness values, the image in the brightness level, through the display panel. According to an embodiment, at least one display brightness value among the plurality of display brightness values corresponding to a brightness level that is greater than the second reference brightness level and is less than or equal to the third reference brightness level may be obtained by executing a calibration using an image of an OPR less than a reference OPR.

According to an example embodiment, the display driver circuit may be configured to identify the OPR of the image. According to an embodiment, the display driver circuit may be configured to, based on the OPR that is the first OPR, obtain a first image by reducing a grayscale value of the image by a first value and display the first image through the display panel. According to an embodiment, the display driver circuit may be configured to, based on the OPR that is the second OPR, obtain a second image by reducing a grayscale value of the image by a second value that is less than the first value and display the second image through the display panel.

According to an example embodiment, the processor may be configured to receive an input indicating enabling the second brightness range wider than the first brightness range. According to an embodiment, the processor may be configured to provide a signal indicating to enable the second brightness range to the display driver circuit, in response to the input. According to an embodiment, the display driver circuit may be configured to enable the second brightness range in the display driver circuit, based on the signal.

According to an example embodiment, the display driver circuit may be configured to obtain the information from the processor. According to an embodiment, the display driver circuit may be configured to obtain a control command indicating a brightness level from the processor. According to an embodiment, the display driver circuit may be configured to display, based on the control command and the OPR that is the first OPR, the image within the first brightness range, through the display panel. According to an embodiment, the display driver circuit may be configured to display, based on the control command and the OPR that is the second OPR, the image within the second brightness range, through the display panel. According to an embodiment, the information may be obtained based on a first cycle.

According to an embodiment, the control command may be obtained based on a second cycle longer than the first cycle.

According to an example embodiment, a method executed in an electronic device comprising a processor and a display including a display driver circuit and a display panel may comprise obtaining, by the display driver circuit, information regarding an image from the processor. According to an embodiment, the method may comprise displaying, by the display driver circuit, based on an on pixel ratio (OPR) of the image that is a first OPR, the image within a first brightness range from a first reference brightness level to a second reference brightness level greater than the first reference brightness level, through the display panel. According to an embodiment, the method may comprise displaying, by the display driver circuit, based on the OPR that is a second OPR less than the first OPR, the image within second brightness range from the first reference brightness level to a third reference brightness level greater than the second reference brightness level, through the display panel. According to an embodiment, the third reference brightness level among the second reference brightness level and the third reference brightness level may be identified based on the OPR. According to an embodiment, at least a portion of a bar indicator displayed through the display panel for indicating that the second brightness range is applied may be visually highlighted with respect to a bar indicator displayed through the display panel for indicating that the first brightness range is applied.

According to an example embodiment, the method may comprise obtaining, by the processor, data indicating an illuminance value around the electronic device through an illuminance sensor of the electronic device. According to an embodiment, the method may comprise displaying, based on the data indicating the illuminance value that is greater than or equal to a threshold value and the OPR that is the first OPR, the image in a brightness level corresponding to the second reference brightness level, through the display panel, by the display driver circuit. According to an embodiment, the method may comprise displaying, based on the data indicating the illuminance value that is greater than or equal to the threshold value and the OPR that is the second OPR, the image in a brightness level corresponding to the third reference brightness level, through the display panel, by the display driver circuit.

According to an example embodiment, the method may comprise storing, by the display driver circuit, reference data regarding a plurality of display brightness values for providing the first brightness range. According to an embodiment, the method may comprise obtaining, by the display driver circuit, the information regarding the image of the OPR that is the second OPR from the processor. According to an embodiment, the method may comprise obtaining a control command indicating a brightness level that is greater than the second reference brightness level and is less than or equal to the third reference brightness level, from the processor. According to an embodiment, the method may comprise identifying, by the display driver circuit, in response to the control command, a display brightness value indicating the brightness level by executing an extrapolation using at least a portion of the plurality of display brightness values. According to an embodiment, the method may comprise displaying, by the display driver circuit, based on the display brightness value, the image in the brightness level, through the display panel through the display panel.

According to an example embodiment, the method may comprise storing reference data regarding a plurality of display brightness values for providing the first brightness range, by the display driver circuit. According to an embodiment, the method may comprise obtaining, by the display driver circuit, the information regarding the image of the OPR that is the second OPR from the processor. According to an embodiment, the method may comprise obtaining, by the display driver circuit, a control command indicating a brightness level that is greater than the second reference brightness level and is less than or equal to the third reference brightness level from the processor. According to an embodiment, the method may comprise identifying, by the display driver circuit, in response to the control command, data regarding a difference between the second reference brightness level that is a maximum brightness level of the first brightness range and the brightness level, based on at least a portion of the plurality of display brightness values. According to an embodiment, the method may comprise identifying, by the display driver circuit, current to be provided to each of the plurality of pixels of the display panel, based on the data. According to an embodiment, the method may comprise displaying, by the display driver circuit, based on providing the identified current to each of the plurality of pixels, the image in the brightness level, through the display panel.

According to an example embodiment, the method may comprise storing, by the display driver circuit, reference data regarding a plurality of display brightness values for providing the first brightness range. According to an embodiment, the method may comprise obtaining, by the display driver circuit, the information regarding the image of the OPR that is the second OPR from the processor. According to an embodiment, the method may comprise obtaining, by the display driver circuit, a control command indicating a brightness level that is greater than the second reference brightness level and is less than or equal to the third reference brightness level from the processor. According to an embodiment, the method may comprise identifying, in response to the control command, data regarding a difference between the second reference brightness level that is a maximum brightness level of the first brightness range and the brightness level, based on at least a portion of the plurality of display brightness values. According to an embodiment, the method may comprise displaying, by modulating the image based on the data, the image in the brightness level through the display panel, by the display driver circuit.

According to an example embodiment, the method may comprise storing, by the display driver circuit, reference data regarding a plurality of display brightness values for providing the second brightness range. According to an embodiment, the method may comprise obtaining, by the display driver circuit, the information regarding the image of the OPR that is the second OPR from the processor. According to an embodiment, the method may comprise obtaining, by the display driver circuit, a control command indicating a brightness level that is greater than the second reference brightness level and is less than or equal to the third reference brightness level from the processor. According to an embodiment, the method may comprise identifying, by the display driver circuit, a portion of the plurality of display brightness values corresponding to the brightness level. According to an embodiment, the method may comprise displaying, by the display driver circuit, based on the portion of the plurality of display brightness values, the image in the brightness level, through the display panel. According to an embodiment, at least one display brightness value among the plurality of display brightness values corresponding to a brightness level that is greater than the second reference brightness level and is less than or equal to the third reference brightness level may be obtained by executing a calibration using an image of an OPR lower than a reference OPR.

According to an example embodiment, the method may comprise identifying, by the display driver circuit, the OPR of the image. According to an embodiment, the method may comprise, based on the OPR that is the first OPR, obtaining, by the display driver circuit, a first image by reducing a grayscale value of the image by a first value and displaying the first image, through the display panel. According to an embodiment, the method may comprise, based on the OPR that is the second OPR, obtaining, by the display driver circuit, a second image by reducing a grayscale value of the image by a second value that is less than the first value and displaying the second image, through the display panel 230.

According to an example embodiment, the method may comprise receiving, by the processor, an input indicating to enable the second brightness range wider than the first brightness range. According to an embodiment, the method may comprise providing, by the processor, a signal indicating to enable the second brightness range to the display driver circuit, in response to the input. According to an embodiment, the method may comprise enabling, by the display driver circuit, the second brightness range in the display driver circuit, based on the signal.

According to an example embodiment, the method may comprise obtaining, by the display driver circuit, the information from the processor. According to an embodiment, the method may comprise obtaining, by the display driver circuit, a control command indicating a brightness level from the processor. According to an embodiment, the method may comprise displaying, by the display driver circuit, based on the control command and the OPR that is the first OPR, the image within the first brightness range, through the display panel. According to an embodiment, the method may comprise displaying, by the display driver circuit, based on the control command and the OPR that is the second OPR, the image within the second brightness range through the display panel. According to an embodiment, the information may be obtained based on a first cycle. According to an embodiment, the control command may be obtained based on a second cycle longer than the first cycle.

According to an example embodiment, an electronic device may comprise a display comprising a display driver circuit and a display panel. According to an embodiment, the electronic device may comprise a processor. According to an embodiment, the display driver circuit may be configured to display a first image in a first brightness level, through the display panel. According to an embodiment, the display driver circuit may be configured to obtain, while the first image is displayed in the first brightness level, information regarding a second image with an on pixel ratio (OPR) less than an OPR of the first image, from the processor. According to an embodiment, the display driver circuit may be configured to, based on the obtaining, display the second image changed from the first image in a second brightness level greater than the first brightness level, through the display panel. According to an embodiment, the second reference brightness level may be identified based on the OPR of the second image. According to an embodiment, at least a portion of a bar indicator displayed through the display panel while the second image is displayed may be visually highlighted with respect to the bar indicator displayed through the display panel while the first image is displayed.

According to an example embodiment, the first image and the second image may be displayed while an illuminance around the electronic device is greater than or equal to a threshold illuminance.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software 940 including one or more instructions that are stored in a storage medium or a storage device (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a display comprising display driver circuitry, and a display panel; and at least one processor comprising processing circuitry, wherein the display driver circuitry is configured to:

obtain information regarding an image, from the at least one processor;

display, based on an on pixel ratio (OPR) of the image that is a first OPR, the image within first brightness range from a first reference brightness level to a second reference brightness level greater than the first reference brightness level, through the display panel; and display, based on the OPR that is a second OPR less than the first OPR, the image within second brightness range from the first reference brightness level to a third reference brightness level greater than the second reference brightness level, through the display panel, wherein the third reference brightness level among the second reference brightness level and the third reference brightness level is identified according to the OPR, and wherein at least portion of a bar indicator displayed through the display panel for indicating that the second brightness range is applied is configured to be visually highlighted relative to a bar indicator displayed through the display panel for indicating that the first brightness range is applied.

2. The electronic device of claim 1, further comprising:

an illuminance sensor; and memory, storing instructions, comprising one or more storage media, wherein, when executed by the at least one processor individually or collectively, the instructions cause the electronic device to, obtain data indicating an illuminance value about the electronic device through the illuminance sensor, and wherein the display driver circuitry is further configured to:

display, based on the data indicating the illuminance value greater than a threshold value and the OPR that is the first OPR, the image in a brightness level corresponding to the second reference brightness level, through the display panel; and display, based on the data indicating the illuminance value greater than the threshold value and the OPR that is the second OPR, the image in a brightness level corresponding to the third reference brightness level, through the display panel.

3. The electronic device of claim 1, wherein the display driver circuitry is configured to:

store reference data regarding a plurality of display brightness values for providing the first brightness range;

obtain the information regarding the image of the OPR that is the second OPR from the at least one processor;

obtain a control command indicating a brightness level greater than the second reference brightness level and less than the third reference brightness level;

identify, in response to the control command, a display brightness value indicating the brightness level by executing an extrapolation using at least portion of the display brightness values; and display, based on the display brightness value, the image in the brightness level, through the display panel.

4. The electronic device of claim 1, wherein the display panel comprises pixels, and wherein the display driver circuitry is configured to:

obtain the information regarding the image of the OPR that is the second OPR from the at least one processor;

obtain, from the at least one processor, a control command indicating a brightness level greater than the second reference brightness level and less than the third reference brightness level;

identify, in response to the control command, data regarding difference between the second reference brightness level that is a maximum brightness level of the first brightness range and the brightness level;

identify a current to be provided to each of the pixels, based on the data; and display, based on providing the identified current to each of the pixels, the image in the brightness level, through the display panel.

5. The electronic device of claim 1, wherein the display driver circuitry is configured to:

store reference data regarding a plurality of display brightness values for providing the first brightness range;

obtain the information regarding the image of the OPR that is the second OPR from the at least one processor;

obtain, from the at least one processor, a control command indicating a brightness level greater than the second reference brightness level and less than the third reference brightness level;

identify, in response to the control command, data regarding difference between the second reference brightness level that is a maximum brightness level of the first brightness range and the brightness level; and based on modulating the image using the data, display the modulated image in the brightness level, through the display panel.

6. The electronic device of claim 1, wherein the display driver circuitry is configured to:

store reference data regarding a plurality of display brightness values for providing the second brightness range;

obtain the information regarding the image of the OPR that is the second OPR from the at least one processor;

obtain, from the at least one processor, a control command indicating a brightness level greater than the second reference brightness level and less than the third reference brightness level;

identify, in response to the control command, a portion of the display brightness values corresponding to the brightness level; and display, based on the portion of the display brightness values, the image in the brightness level, through the display panel, and wherein at least one display brightness value among the display brightness values corresponding to a brightness level greater than the second reference brightness level and less than the third reference brightness level is obtained by executing a calibration using an image of an OPR less than a reference OPR.

7. The electronic device of claim 1, wherein the display driver circuitry is configured to:

identify the OPR of the image;

based on the OPR that is the first OPR, obtain a first image by reducing a grayscale value of the image by a first value and display the first image, through the display panel; and based on the OPR that is the second OPR, obtain a second image by reducing a grayscale value of the image by a second value less than the first value and display the second image, through the display panel.

8. The electronic device of claim 1, further comprising:

memory, storing instructions, comprising one or more storage media, wherein, when executed by the at least one processor individually or collectively, the instructions cause the electronic device to:

receive an input indicating to enable the second brightness range wider than the first brightness range; and in response to the input, provide a signal indicating to enable the second brightness range to the display driver circuitry, and wherein the display driver circuitry is configured to enable the second brightness range in the display driver circuitry, based on the signal.

9. The electronic device of claim 1, wherein the display driver circuitry is configured to:

obtain the information from the at least one processor;

obtain a control command indicating a brightness level from the at least one processor;

display, based on the control command and the OPR that is the first OPR, the image within the first brightness range, through the display panel; and display, based on the control command and the OPR that is the second OPR, the image within the second brightness range, through the display panel, wherein the information is obtained based on a first cycle, and wherein the control command is obtained based on a second cycle longer than the first cycle.

10. A method executed in an electronic device comprising at least one processor comprising processing circuitry, and a display comprising display driver circuitry and a display panel, the method comprising:

obtaining, by the display driver circuitry, information regarding an image from the at least one processor;

displaying, based on an on pixel ratio (OPR) of the image that is a first OPR, the image within first brightness range from a first reference brightness level to a second reference brightness level greater than the first reference brightness level, through the display panel, by the display driver circuitry; and displaying, based on the OPR that is a second OPR lower than the first OPR, the image within second brightness range from the first reference brightness level to a third reference brightness level greater than the second reference brightness level, through the display panel, by the display driver circuitry, wherein the third reference brightness level among the second reference brightness level and the third reference brightness level is identified according to the OPR, and wherein at least portion of a bar indicator displayed through the display panel for indicating that the second brightness range is applied is configured to be visually highlighted relative to a bar indicator displayed through the display panel for indicating that the first brightness range is applied.

11. The method of claim 10, further comprising:

obtaining, by the at least one processor, data indicating an illuminance value around the electronic device through an illuminance sensor of the electronic device;

displaying, based on the data indicating the illuminance value greater than a threshold value and the OPR that is the first OPR, the image in a brightness level corresponding to the second reference brightness level, through the display panel, by the display driver circuitry; and displaying, based on the data indicating the illuminance value greater than the threshold value and the OPR that is the second OPR, the image in a brightness level corresponding to the third reference brightness level, through the display panel, by the display driver circuitry.

12. The method of claim 10, further comprising:

storing, by the display driver circuitry, reference data regarding a plurality of display brightness values for providing the first brightness range;

obtaining, by the display driver circuitry, the information regarding the image of the OPR that is the second OPR from the at least one processor;

obtaining, by the display driver circuitry, a control command indicating a brightness level greater than the second reference brightness level and less than the third reference brightness level;

identifying, in response to the control command, a display brightness value indicating the brightness level by executing an extrapolation using at least portion of the display brightness values, by the display driver circuitry; and displaying, based on the display brightness value, the image in the brightness level, through the display panel, by the display driver circuitry.

13. The method of claim 10, further comprising:

obtaining, by the display driver circuitry, the information regarding the image of the OPR that is the second OPR from the at least one processor;

obtaining, by the display driver circuitry, a control command indicating a brightness level greater than the second reference brightness level and less than the third reference brightness level, from the at least one processor;

identifying, in response to the control command, data regarding difference between the second reference brightness level that is a maximum brightness level of the first brightness range and the brightness level, by the display driver circuitry;

identifying a current to be provided to each of pixels included in the display panel, based on the data, by the display driver circuitry; and displaying, based on providing the identified current to each of the pixels, the image in the brightness level, through the display panel, by the display driver circuitry.

14. The method of claim 10, further comprising:

storing, by the display driver circuitry, reference data regarding a plurality of display brightness values for providing the first brightness range;

obtaining, by the display driver circuitry, the information regarding the image of the OPR that is the second OPR from the at least one processor;

obtaining, by the display driver circuitry, a control command indicating a brightness level greater than the second reference brightness level and less than the third reference brightness level;

identifying, in response to the control command, data regarding difference between the second reference brightness level that is a maximum brightness level of the first brightness range and the brightness level, by the display driver circuitry; and based on modulating the image using the data, displaying the image in the brightness level, through the display panel, by the display driver circuit.

15. The method of claim 10, further comprising:

storing, by the display driver circuitry, reference data regarding a plurality of display brightness values for providing the second brightness range;

obtaining, by the display driver circuitry, the information regarding the image of the OPR that is the second OPR from the at least one processor;

obtaining, by the display driver circuitry, a control command indicating a brightness level greater than the second reference brightness level and less than the third reference brightness level, from the at least one processor;

identifying, in response to the control command, a portion of the display brightness values corresponding to the brightness level, by the display driver circuitry; and displaying, based on the portion of the display brightness values, the image in the brightness level, through the display panel, by the display driver circuitry, wherein at least one display brightness value among the display brightness values corresponding to a brightness level greater than the second reference brightness level and less than the third reference brightness level is obtained by executing a calibration using an image of an OPR lower than a reference OPR.

16. The method of claim 10, further comprising:

identifying, by the display driver circuitry, the OPR of the image;

based on the OPR that is the first OPR, obtaining, by the display driver circuitry, a first image by reducing a grayscale value of the image by a first value and displaying, by the display driver circuitry, the first image, through the display panel; and based on the OPR that is the second OPR, obtaining, by the display driver circuitry, a second image by reducing a grayscale value of the image by a second value less than the first value and displaying, by the display driver circuitry, the second image, through the display panel.

17. The method of claim 10, further comprising:

receiving, by the at least one processor, an input indicating to enable the second brightness range wider than the first brightness range;

providing, by the at least one processor, a signal indicating to enable the second brightness range to the display driver circuitry, in response to the input; and enabling, by the display driver circuitry, the second brightness range in the display driver circuitry, based on the signal.

18. The method of claim 10, further comprising:

obtaining, by the display driver circuitry, the information from the at least one processor;

obtaining, by the display driver circuitry, a control command indicating a brightness level from the at least one processor;

displaying, based on the control command and the OPR that is the first OPR, the image within the first brightness range, through the display panel, by the display driver circuitry; and displaying, based on the control command and the OPR that is the second OPR, the image within the second brightness range, through the display panel, by the display driver circuitry.

19. An electronic device comprising:

a display comprising display driver circuitry, and a display panel; and at least one processor comprising processing circuitry, wherein the display driver circuitry is configured to:

display a first image in a first brightness level, through the display panel;

obtain, while the first image is displayed in the first brightness level, information regarding a second image with an on pixel ratio (OPR) lower than an OPR of the first image; and based on obtaining the information, display the second image changed from the first image in a second brightness level greater than the first brightness level, through the display panel, wherein at least portion of a bar indicator displayed through the display panel with respect to the second image is visually highlighted relative to a bar indicator displayed through the display panel with respect to the first image.

20. The electronic device of claim 19, wherein the first image and the second image are sequentially displayed while an illuminance about the electronic device is greater than a threshold illuminance.

* * * * *